United States Patent
Coiffic et al.

(10) Patent No.: US 8,323,733 B2
(45) Date of Patent: Dec. 4, 2012

(54) METHOD FOR PRODUCING A MEMBRANE COMPRISING MICROPASSAGES MADE FROM POROUS MATERIAL BY CHEMICAL MECHANICAL POLISHING

(75) Inventors: Jean-Christophe Coiffic, Grenoble (FR); Maurice Rivoire, Meylan (FR)

(73) Assignees: Commisariat a l'Energie Atomique, Paris (FR); STMicroelectronics (Crolles 2) SAS, Crolles (FR)

( * ) Notice: Subject to any disclaimer, the term of this patent is extended or adjusted under 35 U.S.C. 154(b) by 784 days.

(21) Appl. No.: 12/382,459

(22) Filed: Mar. 17, 2009

(65) Prior Publication Data

US 2009/0252871 A1 Oct. 8, 2009

(30) Foreign Application Priority Data

Apr. 8, 2008 (FR) ...................... 08 01922

(51) Int. Cl.
 *B05D 5/00* (2006.01)
(52) U.S. Cl. ........................ 427/244; 427/369
(58) Field of Classification Search .......... 427/240–241, 427/243–245, 247, 359, 360, 365, 369–370, 427/355, 367, 371, 425; 502/439; 210/506; 55/524; 428/550
See application file for complete search history.

(56) References Cited

U.S. PATENT DOCUMENTS

| | | | |
|---|---|---|---|
| 3,238,056 A * | 3/1966 | Pall et al. | 428/338 |
| 3,594,292 A * | 7/1971 | Russell et al. | 428/596 |
| 4,731,263 A * | 3/1988 | Martin et al. | 427/385.5 |
| 4,888,114 A * | 12/1989 | Gaddis et al. | 210/500.25 |
| 5,004,544 A * | 4/1991 | Hay et al. | 210/490 |
| 6,613,241 B1 | 9/2003 | Scherer et al. | |
| 6,780,786 B2 * | 8/2004 | Dougherty | 438/758 |
| 2001/0028872 A1 | 10/2001 | Iwasaki et al. | |
| 2006/0194037 A1 | 8/2006 | Fink et al. | |
| 2008/0028741 A1* | 2/2008 | Ishida et al. | 57/281 |

OTHER PUBLICATIONS

Kim et al; "Crossflow membrane filtration of interacting nanoparticle suspensions;" *Journal of Membrane Science*; Aug. 15, 2006; pp. 361-372; vol. 284; Elsevier Publishers.
Peyrade et al; "Direct observation and localization of colloidal nanoparticles on patterned surface by capillary forces;" *Microelectronic Engineering*; Mar. 3, 2006; pp. 1521-1525; vol. 83; Elsevier Publishers.
Xie et al; "Effects of particle size, polishing pad and contact pressure in free abrasive polishing;" *Wear*; 1996; pp. 281-295; vol. 200; Elsevier Publishers.
Merritt et al; "High performance nanoporous carbon membranes for air separation;" *Carbon*; 2007; pp. 1267-1278; vol. 45; Elsevier Publishers.

\* cited by examiner

*Primary Examiner* — Frederick Parker
*Assistant Examiner* — Alex A Rolland
(74) *Attorney, Agent, or Firm* — Oliff & Berridge, PLC

(57) ABSTRACT

A surface of a support comprising through micropassages is brought into contact with an aqueous solution comprising a plurality of particles in suspension and a pad. A pressure perpendicular to the plane of the support, between the pad and the surface of the support, and a relative movement of the pad and of the surface in a direction parallel to the plane of the support are applied. At least one particle is thus introduced in each microgap to form a porous material therein.

17 Claims, 3 Drawing Sheets

METHOD FOR PRODUCING A MEMBRANE COMPRISING MICROPASSAGES MADE FROM POROUS MATERIAL BY CHEMICAL MECHANICAL POLISHING

BACKGROUND OF THE INVENTION

The invention relates to a method for forming a porous membrane.

STATE OF THE ART

The efficiency of membranes depends on the width of their pores and on the specific surface are of the contact between the element to be filtered and the membrane itself. Controlling the size of the pores is therefore of paramount importance when fabricating a membrane. Controlling the size of a membrane is therefore of the utmost importance. Membrane fabrication increasingly involves assembling nanoparticles of predefined sizes with one another. Moreover, the particles must have a certain mechanical strength for the fluid flow passing through the membrane not to destroy or sweep away the particles that form the active part of the membrane (article by Kim et al. "Crossflow membrane filtration of interacting nanoparticle suspension", Journal of Membrane Science 284 (2006) 361-372).

OBJECT OF THE INVENTION

The object of the invention is to form a membrane in industrial and easy manner with a great reproducibility in producing the porous material.

According to the invention, this object is achieved by the accompanying claims and more particularly by the fact that the method successively comprises:
  formation, in the support from the first main surface, of at least one micropassage that passes through the support,
  bringing the first main surface into contact with an aqueous solution comprising a plurality of particles in suspension,
  simultaneously applying a pressure perpendicularly to the plane of the support between a pad and said first surface and relative movement of the pad and of said first surface in a direction parallel to the plane of the support to introduce at least one particle into each micropassage.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PREFERRED EMBODIMENTS OF THE INVENTION

According to the invention, the membrane comprises at least one micropassage filled by a porous material, between first and second main surfaces of an impermeable support.

Porous materials formed by depositions of particles have been achieved in small microgaps with techniques called capillarity or sedimentation techniques, but these techniques are not suitable for an industrial approach. Such techniques have in particular been described by Peyrade et al. "Direct observation and localization of colloidal nanoparticles on patterned surface by capillary forces" Microelectronic Engineering 83 (2006) 1521-1525.

Figure 1:
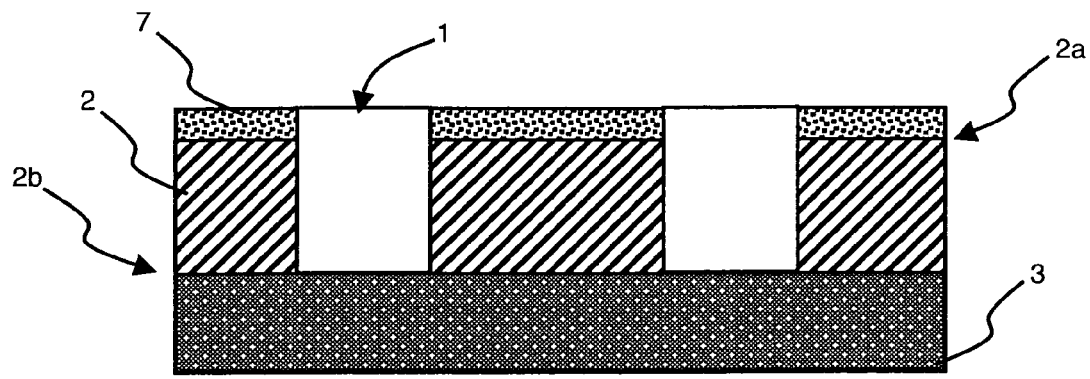
FIGS. 1 to 3 schematically represent cross-sections of the successive steps of the production method according to the invention, FIGS. 4 to 8 schematically represent cross-sections of alternative embodiments of the production method according to the invention.

As illustrated in FIG. 1, a membrane comprises a support 2 inside which micropassages 1 are formed between parallel first and second main surfaces 2a and 2b. Micropassages 1 are formed in conventional manner, for example by photolithography and etching from the first main surface 2a through to the second main surface 2b.

Support 2 can be formed by a substrate, for example a silicon substrate or a glass substrate, or be composed of a stack of layers. Support 2 can also be made from Cu, Al, Fe, Co, Ni, Pd, Pt, W, Cr, TiN, TaN, Ta, Ti, Au, Ru, etc, or alloys or oxides thereof. Support 2 is made from a material that is impermeable and inert to the different products that may be used with the membrane.

In a particular embodiment illustrated in FIG. 1, a support layer 3 is advantageously formed on the second main surface 2b of the support. The micropassages 1 are then made from the first main surface 2a through to support layer 3. When the micropassages are formed, the support layer can be partially etched. The micropassages 1 are therefore formed in support 2 but are covered by support layer 3. Support layer 3 makes for easy production as it can be eliminated easily. Layer 3 provides mechanical strength, but can also act as stop layer for formation of nanotubes or for a polishing step.

Figure 2:
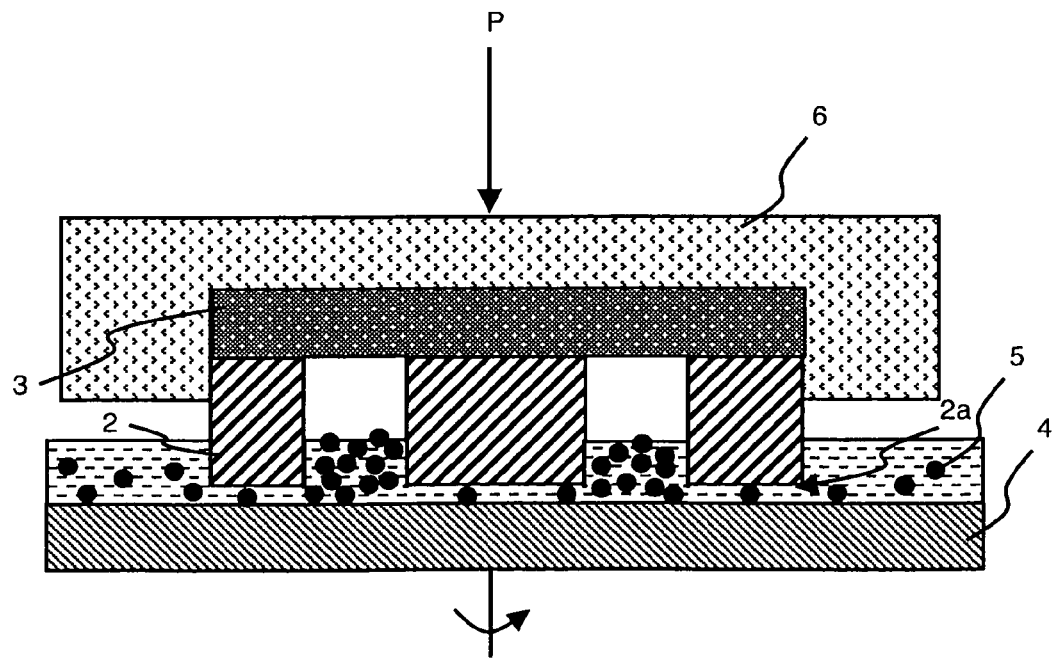

The first main surface 2a of the support, which comprises micropassages 1, then undergoes chemical mechanical deposition, which is similar to chemical mechanical polishing methods. Thus, as illustrated in FIG. 2, the first main surface 2a onto which micropassages 1 open out is placed in contact with a pad 4 covered by an aqueous solution that contains particles 5. In conventional manner, a force is applied on the support in a direction forming an angle with the plane of the support that is not zero. The tangent of this angle is equal to the value of the height of the space between the support and the pad to the diameter of the support. This force results in creation of a pressure P between support 2 and pad 4, advantageously perpendicularly to the plane of support 2. The force which is representative of the pressure can thus be perpendicular to the plane of the support. An angle comprised between 0 and 5° can also exist between the force and a direction which is perpendicular to the plane of the support. Support 2 further moves for example by rotation with respect to pad 4 or vice-versa, advantageously in a plane parallel to the plane of support 2. In a general manner, chemical mechanical polishing is described by Xie et al "Effects of particle size, polishing pad and contact pressure in free abrasive polishing", WEAR 200 (1996) 281-285.

Figure 3:
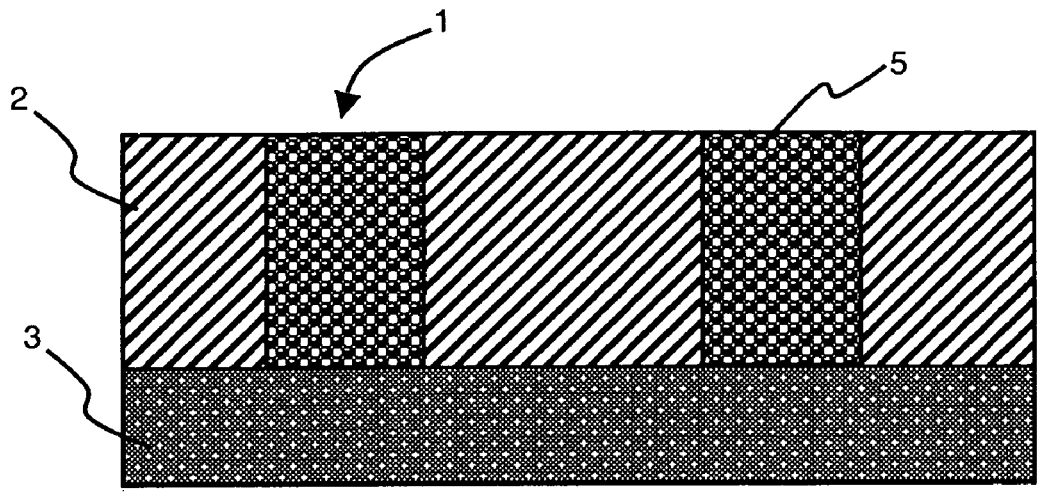

As illustrated in FIG. 3, when chemical mechanical deposition is performed, at least one particle 5 is introduced into each micropassage 1 which was initially empty. A porous material is thereby formed inside the micropassage. It is formed by the particle or particles and the vacuum (or gas) that occupies the remaining volume of the micropassage. The porous material can completely or partially fill micropassage 1. The porous material can be formed by a single particle, but in conventional manner it is formed by a plurality of particles 5. These particles 5 are advantageously compressed in the micropassage to thereby form patterns of porous material that are mechanically stronger. The porous material is a permeable material. The homogeneous arrangement of the pores in the porous material in fact enables a fluid to flow through the latter.

Chemical mechanical deposition can be performed using conventional chemical mechanical polishing equipment, for example with equipment of Mirra or Reflexion type from Applied Materials® or with equipment of Megapol M550 from Alpsitec or with equipment of Frex type from Ebara.

As for conventional chemical mechanical polishing, support 2 is secured to a moving head 6 which enables a pressure P to be exerted between the surface of the support comprising micropassages 1 and pad 4 on which the support rests (FIG. 2). The bearing pressure exerted by the bearing head on support 2 is comprised between 0.02 and 1 daN/cm$^2$. This bearing pressure enables particles 5 to be made to enter micropassages 1 and to be compressed. By adjusting the value of the bearing pressure, it is possible to modulate the final porosity of the porous material, i.e. the proportion of vacuum in the final material. If support layer 3 is not deposited on the support, bearing head 6 will cover the micropassages at the level of the second surface 2b and enable a pressure to be applied on the particles located in the micropassages.

Pads 4 used for chemical mechanical deposition are identical to those used in conventional polishing methods. In conventional manner, the characteristics of pad 4 depend on the required application, on the materials located at the surface of the support and on the dimensions of the micropassages to be filled.

If the smallest dimension of micropassages 1 is larger than 10 μm, pads 4 made of polyurethane called "flattening" pads with a "shore D" hardness rating comprised between 50 and 70, a density comprised between 60 and 90 mg/cm$^3$ and a compressibility of less than 4% are used. An off-the-shelf IC1000™ pad from Rohm & Haas is advantageously used.

If the smallest dimension of micropassages 1 is less than 10 μm, pads 4 called "medium" pads with a "shore A" hardness rating comprised between 50 and 70, a density comprised between 20 and 40 mg/cm$^3$ and a compressibility comprised between 10 and 25% are used. An off-the-shelf Suba IV™ pad from Rohm & Haas is advantageously used.

If the dimensions of micropassages 1 are around the micron and/or if the surface of the support in contact with pad 4 comprises ductile materials which are liable to be scratched by particles, polishing pads 4 called "finishing" pads, with a "shore A" hardness rating from 50 to 80, a density of less than 20 mg/cm$^3$, and a compressibility greater than or equal to 30% are used. An off-the-shelf Politex™ pad from Rohm & Haas is advantageously used.

As in the case of chemical mechanical polishing, when deposition is performed, support 2 is in contact with an aqueous solution. Typically, deposition uses an aqueous suspension of anionic or cationic colloidal particles having a pH comprised between 1.5 and 12 to obtain a stable suspension of particles. Adjusting the pH enables the zeta potential which controls separation of particles 5 in the aqueous solution to be fixed.

Particles 5 in suspension in the aqueous solution can be pure or formed by a core material covered by a coating material. If particles 5 are pure, they are for example made of silica, carbon, cerium oxide, titanium oxide, alumina, polymer material or from different metals, for example, Fe, Co, Au, Pd, Ni, Pt, Ru, Sn, Mo, ZnO, Ce, etc. If particles 5 are coated, the coating material is for example alumina, cerium oxide or iron oxide. They are for example particles of silica or of polymer materials or compounds coated with alumina or cerium oxide. The use of a coating material enables the zeta potential to be made to vary thus making for easy separation of the elementary particles from the colloidal suspension.

The size of elementary particles 5 is advantageously comprised between 3 and 300 nm. Moreover, the mass percentage of particles 5 in the aqueous solution is advantageously comprised between 0.0001 and 50%. The particles can be spherical or of any shape.

For example, the off-the-shelf aqueous solutions Klebosol™ 1508-35 and T605 can be used.

The off-the-shelf aqueous solution Klebosol™ 1508-35 is marketed by Rohm & Haas and comprises 30% weight of silica particles having a diameter of 35 nm in an anionic solution with a pH of about 10 adjusted with $NH_4OH$. The off-the-shelf aqueous solution T605 is marketed by Hitachi Chemical and contains 0.1% weight of silica particles having a diameter of 90 nm in an anionic solution with a pH of about 6.5.

Furthermore, chemical mechanical deposition is advantageously performed with an aqueous solution flowrate comprised between 5 and 300 ml/min for substrates varying between 1 and 450 mm. A relative speed of a point of the substrate with respect to a point of pad 4 is then comprised between 0.1 and 0.3 m/s. In conventional manner, the deposition temperature is comprised between 2 and 70° C. The aqueous solution supply rate is adjusted to ensure renewal of the particles and to guarantee an excess of particles 5 in the pores of the polishing pad.

For example, a bearing pressure of about 0.1 daN/cm2, a speed of 1 m/s, an aqueous solution flowrate of 150 ml/min for substrates with a diameter of 200 mm and a temperature of 52° C. are used to perform chemical mechanical deposition. Under these conditions, particles 4 of silicon oxide having a mean diameter of about 35 nm are used with microgaps with a diameter of about 150 nm. Klebosol™ 1508-35 aqueous solution is advantageously used.

In conventional manner, when chemical mechanical deposition is performed, polishing pad 4 only removes particles 5 from the aqueous solution on the parts in contact with the support, i.e. on the parts of support 2 bordering the micropassages and/or in the areas where the porous material is salient from the plane of the support.

However, when chemical mechanical deposition is performed, removal of material could take place on the upper parts of the first surface of the support, while the micropassages are filled by the particles of the aqueous solution. Removal of material depends on the conditions of the method (bearing pressure, particle material, aqueous solution . . . ) and on the type of material present at the surface of the support.

If the material of support 2 in contact with pad 4 is too fragile and can be eliminated when deposition is performed, a strengthening material 7 is advantageously used (FIG. 1). This strengthening material 7 is then chosen such as to be resistant to the chemical mechanical process so as to reduce or even totally eliminate removal of material on the parts of the support in contact with pad 4 and the aqueous solution. The layer of strengthening material 7 is formed on surface 2a and micropassages 1 are etched in support 2 through the support layer. The support layer is for example made from silicon nitride.

Also in advantageous manner, the side walls of micropassages 1 are covered with a layer of covering material (not shown), for example covered by an insulating material which may for example be silicon oxide. Although the side walls of micropassage 1 are covered by the covering layer, most of the volume of micropassage 1 is not filled. The covering layer is further eliminated in the bottom of micropassage 1. Typically, the bottom of the layer is etched by plasma as for formation of spacers in the microelectronics field.

If the material of support 2 is not chemically compatible with the material used for particles 5, these particles do not adhere on the surface of the material of the gaps and the particles are removed when rinsing with water is performed at the end of polishing and/or when the wafer is cleaned by brushing and drying. The covering material is therefore advantageously used according to the materials present and the required applications. The covering material can serve the purpose of making the particles adhere, but can also act as electrical insulating layer or as barrier layer preventing dopant diffusion or formation of metal dendrites.

The pressure exerted by pad 4 on the particles arranged in the micropassages causes bonds to be created between the particles and also with the micropassage walls. When drying takes place, the particles remain chemically or electrostatically bonded to one another and to the micropassage walls. The pressure exerted on the particles can also result in sintering of the particles, thereby improving the mechanical strength of the whole of the micropassage.

The number of particles 5 arranged in micropassage 1 and the size of the pores of the porous material obtained depend on the dimensions of micropassage 1, on the dimensions of particles 5 and on the pressure exerted on the particles.

To obtain one particle per micropassage, it is advantageous to opt for a particle having substantially the same dimension as the micropassage. To obtain two particles per micropassage, it is advantageous to choose particles that are assumed to be spherical and that have diameters substantially equal to two thirds of the dimension of the micropassage, which is assumed to be cubic. Thus, to arrange at least two spherical particles in a gap, the latter have to have a diameter that is less than two thirds of the smallest dimension of the micropassage.

If the membrane is intended to be subjected to a high flowrate, it is preferable for the micropassages to be filled with few particles. On the contrary, for a membrane presenting a very high catalytic power efficiency, the surface exchange has to be large and the micropassages are then filled with a very large number of particles. The person skilled in the art will make a trade-off between these two requirements according to the membrane application. The documents "High performance nanoporous carbon membranes for air separation" Carbon 45 (2007) 1267-1278 and "Crossflow membrane filtration of interacting nanoparticle suspensions" Journal of Membrane Science 284 (2006) 361-372 describe the influence of the porosity and size of the pores on the selectivity between two mixed gases. These documents also describe the influence of the shape and size of the particles on the membrane characteristics. They further describe the influence of the arrangement of the particles on the flux passing through the membranes.

Assuming micropassages 1 to be cubic and particles 5 to be spherical, or if the particles are much smaller than the dimensions of the micropassage, the volume occupied by the particles cannot theoretically exceed 74% without compression. In crystallography, a compactness equal to 74% is obtained with stacks referred to as "hexagonal close packing" or "face-centred cubic" stacks. The porous material patterns therefore have a minimum of 26% porosity. In practice, the actual compactness of such structures does not exceed 70%. There is therefore 30% porosity in the micropassages without compression. Moreover, if the spherical particles have a diameter substantially equal to that of the micropassage, the cubic micropassage can only contain a single particle and the porosity reaches 50%. In this way, the porosity can be modulated by controlling the size of the particles located in the micropassage. To decrease the porosity value, the particles have a much smaller diameter than that of the micropassage, preferably less than one third of the width of the micropassage. At least three particles are thus located in the micropassage and a porosity of about 26% can be obtained.

The porous material can be a dielectric material and it is then formed by particles 5 made from a dielectric material and/or covered by a dielectric material. The particles are for example made from silica, cerium oxide, alumina or polymer material if they are pure. However the particles can also be made from conducting material, for example carbon, iron, cobalt, platinum, nickel, etc. covered by a dielectric material. The porous material can also be a catalyst material that allows decomposition reactions of gases or compounds in a liquid or gaseous medium. Producing a membrane comprising areas made from porous catalyst material is particularly interesting, as the temperature of the method being low, typically less than 100° C., the particles of catalyst material are kept totally active.

As illustrated in FIG. 3, micropassages 1 filled with the porous material form passages between the two main surfaces 2a and 2b of support 2. In conventional manner, support 2 and support layer 3 are made from different materials, however they can also comprise the same constituents in different proportions. Support layer 3 is for example made from $Al_2O_3$, $SiO_2$, SiN, SiCN, SiC, SiOC or from polymer material. Support layer 3 can also be a metal.

Figure 4:
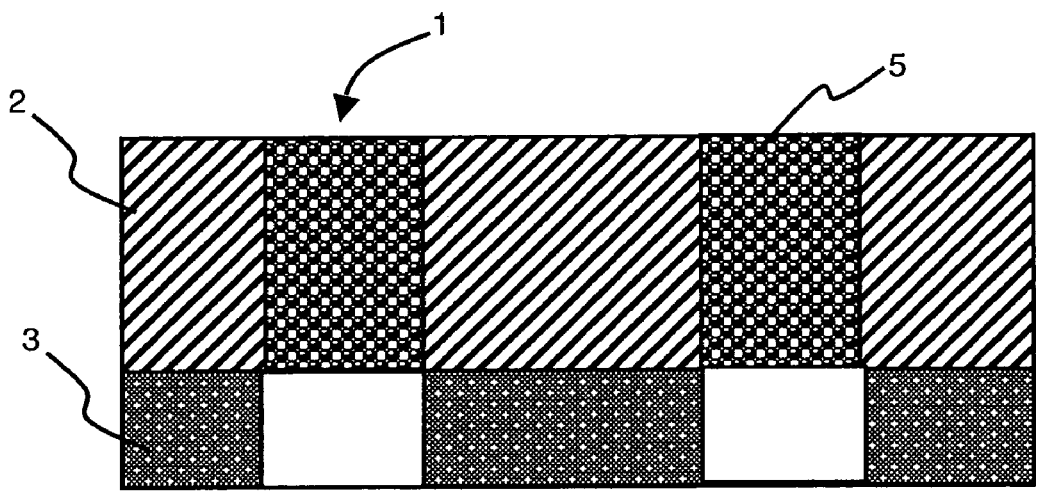

If support layer 3 is made from impermeable material, the latter is then eliminated at least at the level of the passages (FIG. 4) by means of any suitable technique. This elimination of the support layer enables a fluid to flow from one of the main surfaces of the membrane, for example surface 2b, to the other surface 2a. Support layer 3 can for example be made from silicon oxide and elimination thereof is then achieved by means of hydrofluoric acid. The support layer presents an etching selectivity with respect to the porous material and support 2.

Figure 5:
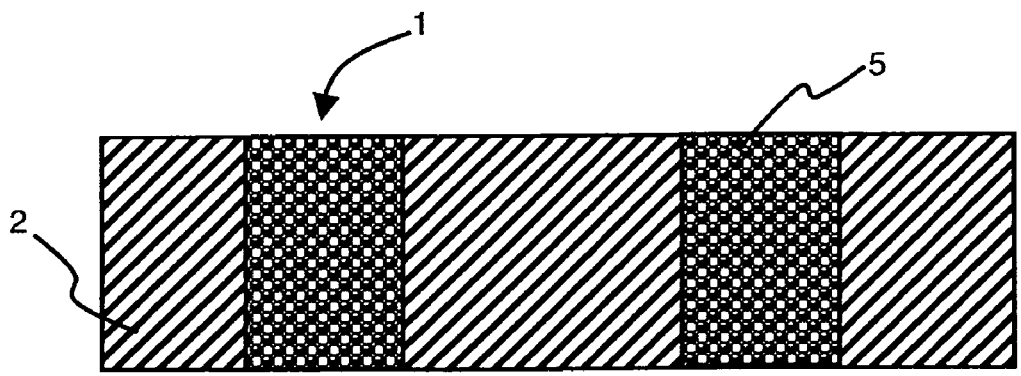

If support layer 3 is permeable to the fluid that is to flow through the membrane, it can be left (FIG. 3) or then be eliminated (FIG. 5) to avoid too great pressure losses at the level of the membrane.

Figure 6:
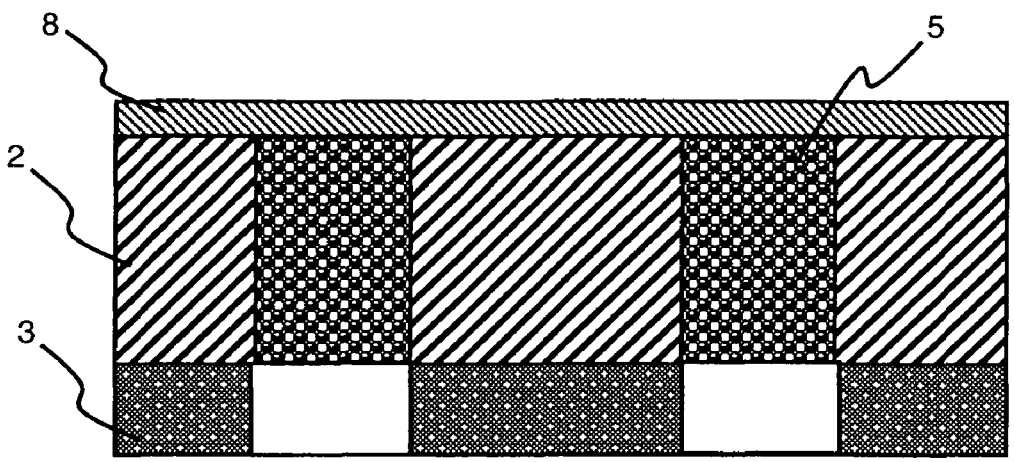

In an alternative embodiment illustrated in FIG. 6, a permeable layer 8 can be formed on at least one main surface 2a or 2b of the membrane. Advantageously, this permeable layer 8 is made from electrically conducting material, however it can also be made from semi-conducting or dielectric material. Even more advantageously, the permeable layer is a layer that allows conduction of protons in the membrane. The permeable layer is then chosen from nafion®, polybenzimidazoles, sulfonated polyetheretherketones, and sulfonated polyimides. The membrane can advantageously be used in a fuel cell.

In another alternative embodiment (not shown), micropassage 1 can be cleaned to eliminate residues contained in the aqueous solution and that were introduced with particles 5. The micropassages are then rinsed by means of a chemical solution which can be a mixture of water, hydrofluoric acid, sulfuric acid, hydrochloric acid and/or hydrogen peroxide. The passage can also be cleaned by means of heat treatment in oxygen at a temperature of more than 200° C., or a remote oxygen plasma can be used.

Figure 7:
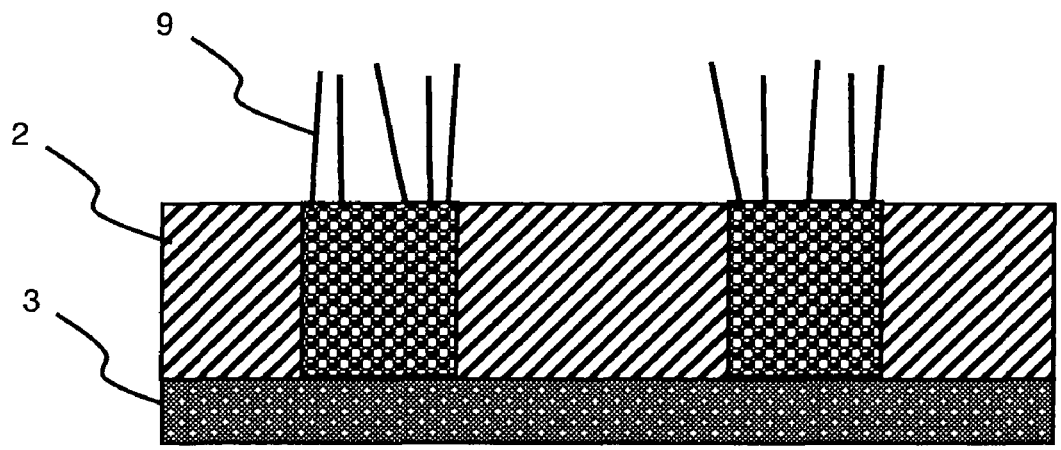
Figure 8:
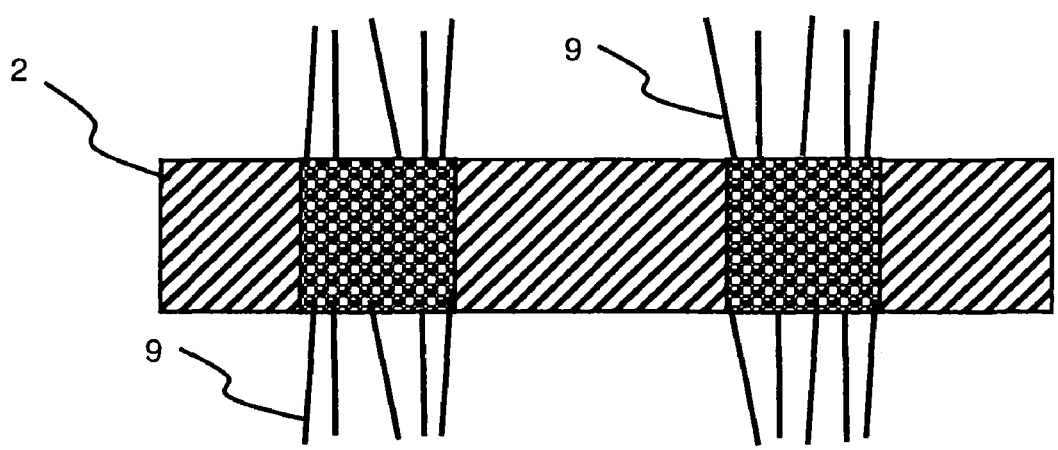

The porous material formed in micropassages 1 can also be used as catalyst material to localize growth of nanotubes or nanowires 9, as illustrated in FIGS. 7 and 8. In this case, support 2 comprising micro-passages 1 filled with the porous catalyst material undergoes a growth process of the nanotubes or nanowires. The nanotubes or nanowires can be electrically conducting or not. Nanoparticles, for example Pt or Ru, can be grafted onto the nanotubes. This application is of particular interest for methanol oxidation membranes in fuel cells. Increasing the contact surface enables the fluxes around the micropassages to be slowed down thereby increasing the efficiency of the membrane. The density of nanotubes or nanowires depends directly on the density and size of the particles.

Growth of silicon nanowires is obtained from a porous catalyst material containing gold particles 5. Furthermore, growth of carbon nanotubes is advantageously obtained from a porous catalyst material containing particles 5 of Fe, Ni and/or Co. However, the porous catalyst material can be made from any material suitable for growth of nanowires and/or nanotubes and in particular from silicon oxide.

As before, the porous material is formed from particles 5 compacted in micropassages 1. In the growth process of nanotubes or nanowires 9, the latter grow vertically from particles 5. Depending on the porosity of the catalyst material, the density of nanotubes or nanowires arising from the porous material pattern may vary.

If support layer 3 is present during the nanotube or nanowire growth process, growth of the latter takes place from the free surface in a substantially vertical direction with respect to the plane of support 2. If the support layer is eliminated before growth takes place, the nanotubes or nanowires grow from the two free surfaces, i.e. on each main surface of the membrane.

Modulating the chemical composition of the particles enables multi-specific membranes to be produced, i.e. membranes that are able to catalyze several species mixed in an initial composition. Modulating the size of the particles (even if they are of the same chemical composition) enables the reactivity of the particles to be made to vary. Modulating the size of the particles enables a wide surface energy range to be obtained and provides a wide reactivity range through the same micropassage. The exceptional reactivity of nano-particles is in fact linked to the fact that they comprise a high ratio between the surface atoms which have free atomic bonds and the atoms of volumes that do not have free bonds. The reactivity increases when the number of free bonds increases. For this reason, it is therefore possible to catalyze a given species with a high probability using a wide range of nanoparticle sizes.

The membrane can be formed by an impermeable support comprising through passages, these through passages being filled with a porous material.

The invention claimed is:

1. A method for forming a porous membrane successively comprising:
   forming, in an impermeable support between first and second main surfaces, at least one micropassage that passes through the support,
   bringing the first main surface into contact with an aqueous solution comprising a plurality of particles in suspension, and
   simultaneously applying a pressure between a pad and said first surface, and relative rotating movement of the pad and of said first surface so as to perform chemical mechanical polishing and to introduce at least one particle forming a porous material into each micropassage, the pad moving in rotation in a plane parallel to a plane defined by the first main surface.

2. The method according to claim 1, wherein the second main surface of the support is covered by an impermeable support layer, said support layer being eliminated at least at the level of the micropassages after the micropassages have been filled by the porous material.

3. The method according to claim 1, wherein the second main surface of the support is covered by a permeable support layer.

4. The method according to claim 1, wherein the porosity of the material filling the micropassage is comprised between 26% and 50%.

5. The method according to claim 1, wherein the particles being spherical, they have a diameter of less than two thirds of the smallest dimension of the micropassage.

6. The method according to claim 1, wherein the diameter of the particles is comprised between 3 and 300 nm.

7. The method according to claim 1, wherein the particles are chosen from silica, carbon, cerium oxide, titanium oxide, iron, cobalt, gold, platinum, palladium, nickel, ruthenium, tin, molybdenum, zinc oxide, cerium, alumina and polymer materials or compounds.

8. The method according to claim 1, wherein the mass percentage of particles in the aqueous solution is comprised between 0.0001 and 50%.

9. The method according to claim 1, wherein the pressure exerted is comprised between 0.02 daN/cm2 and 1 daN/cm2.

10. The method according to claim 1, wherein a support layer is deposited on said first surface of the support before formation of the micropassages.

11. The method according to claim 9, wherein the support layer is made from silicon nitride.

12. The method according to claim 1, wherein at least a part of the particles are made from catalyst material.

13. The method according to claim 1, wherein a proton-conducting permeable layer is formed on at least one of the main surfaces after the micropassages have been filled.

14. The method according to 13, wherein the permeable layer is chosen from polybenzimidalones, sulfonated polyether-etherketones, and sulfonated polyimides.

15. A method for forming a porous membrane successively comprising:
   providing an impermeable support with opposite first and second main surfaces, the first main surface being flat;
   forming, in the impermeable support, at least one micropassage that passes through the impermeable support and connects the first and the second main surfaces;
   bringing the first main surface into contact with an aqueous solution comprising a plurality of particles in suspension; and
   simultaneously applying a pressure between a pad and the first surface, and relative rotating movement of the pad and of the first surface so as to perform chemical mechanical polishing and to introduce a plurality of particles into each micropassage from the first main surface to the second main surface so as to form a porous material filling, the pad moving in rotation in a plane parallel to a plane defined by the first main surface.

16. The method according to claim 15, wherein the second main surface of the support is covered by a support layer, the plurality of particles being compressed between the pad and the support layer.

17. A method for forming a porous membrane successively comprising:
   providing a support comprising first and second opposite main surfaces, the first and second main surfaces comprising first and second complementary portions, the first portion being made of an impermeable support, the second portion being a micropassage passing through the impermeable support, the first and the second main surfaces being flat;

bringing the first main surface into contact with an aqueous solution comprising a plurality of particles in suspension; and simultaneously applying a pressure between a pad and the first surface, and relative rotating movement of the pad and of the first surface so as to perform chemical mechanical polishing and to introduce a plurality of particles into each micropassage and form a porous material into each micropassage, the pad moving in rotation in a plane parallel to a plane defined by the first main surface.

* * * * *